United States Patent
Frotiee

[11] 3,813,809
[45] June 4, 1974

[54] APPARATUS CAPABLE OF BEING SUBMERGED PRINCIPALLY FOR FISHING

[76] Inventor: Jacques Frotiee, Villa La Retraite Avenue Urbain Bosio, 06 Nice, France

[22] Filed: Aug. 11, 1971

[21] Appl. No.: 170,826

[30] Foreign Application Priority Data
Aug. 12, 1970 France .............................. 70.30380

[52] U.S. Cl. .............................................. 43/43.13
[51] Int. Cl. ............................................ A01k 95/00
[58] Field of Search ............. 43/43.13, 42.49, 42.22, 43/42.23

[56] References Cited
UNITED STATES PATENTS

| | | | |
|---|---|---|---|
| 1,670,184 | 5/1928 | Bond .................................. | 43/43.13 |
| 2,234,943 | 3/1941 | Nyman .............................. | 43/43.13 |
| 2,741,863 | 4/1956 | Magill ................................ | 43/43.13 |
| 2,914,884 | 12/1959 | Dahl .................................. | 43/43.13 |
| 3,083,492 | 4/1963 | Kling ................................. | 43/43.13 |

*Primary Examiner*—Warner H. Camp

[57] ABSTRACT

An apparatus capable of being submerged for fishing, adapted to be used on a line and to be displaced relatively in water, which comprises a body equipped with plane stabilizers of a direction and of a thickness such, that a load being susceptible to modify the position of the center of gravity of said body. A lever is orientable and displacable modifying equally the free equilibrium of the lever. The latter is oriented upwardly and forwardly and has at its free end a plurality of holes. A line is secured to one of the holes of the lever and extends through the body and has a fish hook at the extreme end. The tension of the line provokes a jolt to move the lever and causes a rise of said apparatus to the surface of the water, and causes redescending upon release of the tension.

8 Claims, 5 Drawing Figures

PATENTED JUN 4 1974 3,813,809
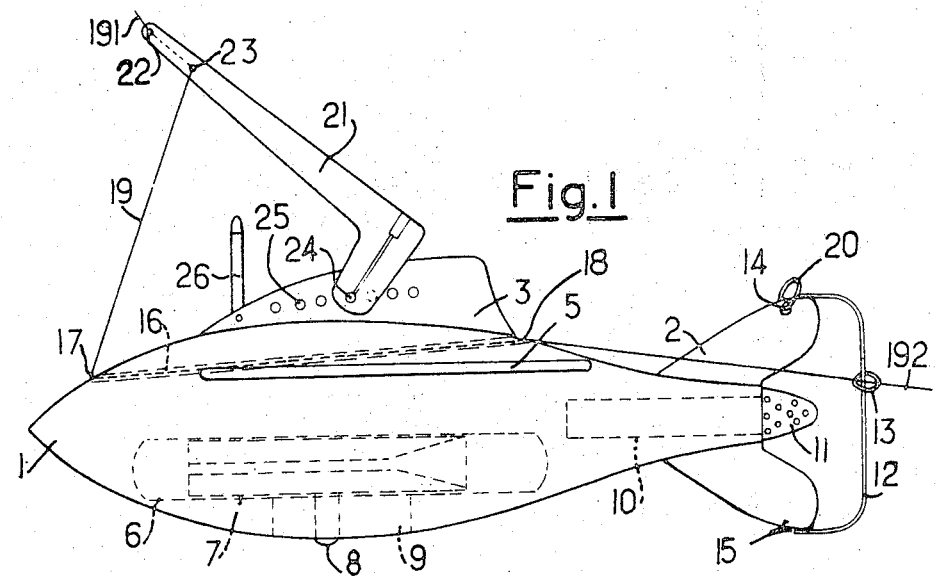
Fig.1
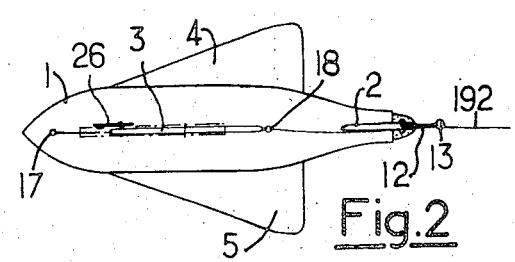
Fig.2
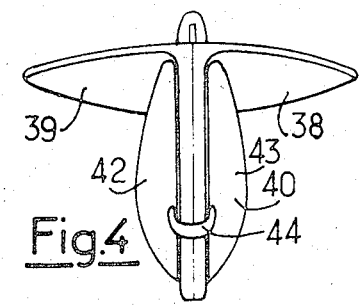
Fig.4
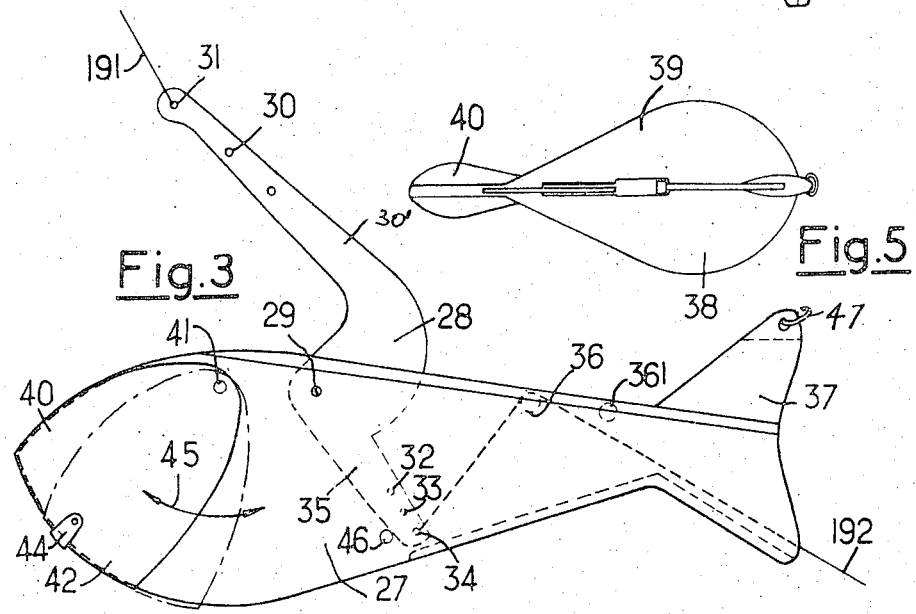
Fig.3
Fig.5

APPARATUS CAPABLE OF BEING SUBMERGED PRINCIPALLY FOR FISHING

The present invention is concerned with a fishing line accessory for selectively controlling the depth of a fishing line.

Loading the line with a greater weight is not entirely satisfactory, because depth control by this means is not accurate. The load does not help in steadfastly hooking the fish.

The status of the prior art can be illustrated by the French Pat. No. 1,194,908 which discloses an apparatus badly profiled, heavier than water and which consequently sinks when the boat stops. It also does not help prevent the fish from getting away.

Another apparatus is described on page 135 of the 1969 catalogue of the Company "Manufacture de St. Etienne" which undesirably overturns when it hits the water and flips over if the boat is stopped.

Japanese Pat. No. 245,717 discloses a plate specially profiled, which has the inconvenience of vibrating in the water.

It is one object of the present invention to provide an apparatus which comprises a profiled body which is equipped with directional and depth, as well as equipped with a movable load which permits to modify the position of the center of gravity and the position of the body. The body has on top an orientable and displaceable lever for also modifying its equilibrium. The device is mounted between two parts of a fishing line. The rear of the pulling side of the line is secured to to the free end of the lever while the front end of the back part of the line is secured in one of several holes in the lever. The body of the lever is guided by different bearing points extending in the axial plane of the body of the device and which extend rearwardly to hooks secured thereto in such a way that while in its normal position, moving relatively to the water, the device remains at a predetermined depth underwater set by its control members. A tug on the line causes the axes of the lever and of the body to come together making the body surface. When the tension on the line ceases, the body submerges again.

With this and other objects in view, which will become apparent in the following detailed description, the present invention, which is shown by example only, will be clearly understood, in connection with the accompanying drawings, in which:

FIG. 1 is an elevation of the apparatus of the present invention, disclosing a first embodiment thereof;

FIG. 2 is a top plan view of the apparatus shown in FIG. 1;

FIG. 3 is an elevation of a second embodiment of the present invention;

FIG. 4 is an end view of the apparatus disclosed in FIG. 3; and

FIG. 5 is a top plan view of the apparatus shown in FIG. 3.

Referring now to the drawings, and in particular to FIGS. 1 and 2, the apparatus comprises a body 1 with a tail fin 2, a central stabilizer 3 and two horizontal, lateral stabilizers 4 and 5. The inside of the body 1 includes a longitudinal housing 6 in which can be displaced by light friction a balance weight 7 with handle 8 which moves in a longitudinal slot 9 and protrudes slightly below the body 1. In the rear of the body 1 is disposed a recess 10 which receives a product to attract the fish, which recess 10 is closed by a perforated stopper 11. The fin 2 has a movable stay 12, on which a ring 13 slides, which stay can be turned about two axes 14 and 15 arranged on the upper and lower part, of fin 2. The body has also a longitudinal hole 16 which terminates at 17 on the front and at 18 at the rear. The line 19 passes through the hole 16 and through the ring 13, unless it passes through the ring 20 disposed in the upper part of the fin 2. Line 19 is fixed to the end of movable lever 21 at one of the holes 22 and 23. The lever 21 turns on axis 24 at its lower end in one of the holes 25 provided one next to the other in the stabilizer 3. The rear portion of the lever 21 abuts on the upper surface of body 1 at the limit of its movement. On the stabilizer 3 is pivoted a hook 26 which oscillates, when upright as shown in FIG. 1, and grabs lever 21, when the latter is lowered toward the axis of the body 1. If the flexible hook 26 is lowered forwardly, it no longer can catch lever 21 when the latter is folded downwardly.

In order to operate the apparatus of the present invention, the same is mounted on a line which, for example is towed behind a boat and which line has a hook at its free end. The end 191 of the cord 19 is attached to the boat, while the end 192 is attached to the hook. The control of the balance weight 7 as well as the position of the axis 24 in one of the holes 25 permit to choose the angle which is assumed by the end 191 with the axis of the body 1 hence its depth. The line 19, after passing through the ring 13, causes to pivot the stay 12 to the left and to the right, and permits to deviate the apparatus to the left and right, that means that the ends 191 and 192 are no more in the same vertical plane. A hook or any other device placed at the end 192 permits pulling a fish which may pull on the end 192. At that moment the tension on the assembly of the cord 19 provokes a sliding of the cord 19 in the hole or tunnel 16 and a shortening of the end of the cord 19 disposed between the hole 23 and the hole 17, so that the front end of the body 1 lifts to come closer to the lever 21. As the forward movement of the apparatus continues, the water exerts pressure on the lateral stabilizers 4 and 5 and the apparatus rises in the water. If the pulling continues, the lever 21 moves towards the body 1 and positions itself below the hook 26 which has been lifted before. Contact by lever 21 against body 1 causes a jolt to the end 192 which hooks the fish. Since the lever 21 is held by the hook 26, the apparatus rises again to the water surface and the fisherman can establish immediately that a fish has been caught. He can then pull up the line.

In order to increase the efficiency of the apparatus, bait can be placed in the recess 10.

If the fish resists and dives, it will pull the apparatus with it, but it will be continually pulled upwardly with a steady pull which aims to fatigue the fish.

A simplified device according to the invention is shown in FIGS. 3 – 5.

The apparatus shown in FIGS. 3 – 5 comprises a flat and elongated body 27 consisting of two juxtaposed plates and slightly separated one from the other, in a manner to allow the insertion of the lower part of a lever 28 pivoted on pivot 29 and which when upright abuts on the abutment 46. The arm 30' of the lever 28, which is outside of the body 27, has at its end a series of holes 30 and 31, in one of which is secured the end 191 of cord 19. The back part 192 of cord 19 is secured along the direction of pull to holes 33 and 34 provided at the end of the arm 35 of the lever 28 disposed inside of the body 27. The line 19 passes then one of the pulleys 36 or 361 in order to be directed rearwardly to the end 192 which passes in the body of the stabilizer 37. In the upper part of the body 27 are provided lateral stabilizers 38 and 39. The controllable load consists of a member 40 turnable about an axis 41. The member 40 consists of two plates 42 and 43 connected by a clamp member 44. The member 40 can assume different positions about the axis 41 by oscillations following the arrow 45, in which position it is blocked due to the braking action against the body 27. The plunging action of the load, regardless of its position, is always oriented forwardly towards the bottom which prevents the device from capsizing and intertwining the two parts of the line.

The operation of the apparatus is very similar to that of the first embodiment.

Depending upon the position of the load 42 and that of the cord 19 in the holes 32, 33, or 34, the apparatus will dive in the water to a greater or lesser depth.

The front end of the rear part of the line, after being fixed at a selected point on the lever, is guided to the rear, to certain points fixed in the axial plane of the profiled body. If a fish increases the pull on end 192, the added drag on the end of the arm 35 of the lever 28 will bring the arm 35 closer to the pulley 36 and upset the body 27, which under the effect of the speed under water will make both the body and the fish rise to the surface. If the fish should gain speed, the apparatus will be lowered as in the first embodiment of the invention. When the lever 28 abuts the body 27, a hooking action will be produced. The jolt will react on the front part of the line 191 and the fisherman will be alerted.

To give the apparatus greater sensibility, the end 192 should be passed through a ring disposed at the upper part of the stabilizer 2 so that it acts on that part of the body 1 (FIGS. 1 and 2) or 27 (FIGS. 3, 4 and 5). This ring is designated as 20 in the first embodiment and as 47 in the second embodiment. The apparatus of the present invention can be appropriately varied as needed.

The designs set forth above are not limited, but are intended to obtain an excellent penetration in the water. Often they can have the shape of a fish. The materials are chosen, as required to sink or to float. Preferably, the stabilizers can be made of transparent plastic materials. One will choose materials that the apparatus will rise itself upon stopping, to avoid that it does not suspend itself but that it descends under the effect of the dynamic movement. The submersible apparatus of the present invention can have applications other than fishing. In particular it could be adapted for underwater photography. Other utilizations could be found. The device of the invention also can be modified so as to serve as an underwater observation vessel pulled by a surface vessel. This apparatus could permit the examination of ocean- or water-floors.

While I have disclosed several embodiments of the present invention, it is to be understood that these embodiments are given by example only and not in a limiting sense.

I claim:

1. A submersible device for attaching on a fishing line for selectively controlling the depth thereof, comprising a floatable elongated body having a front end and a rear end terminating into a vertical tail fin,
lateral diving fins on the body,
stop means on said body,
an elongated lever having one end portion pivoted to the upper part of said body and movable along a vertical plane from a position proximate to said front end of said body to another position substantially perpendicular to said body, wherein said one end portion abuts said stop means;
said lever having an opposite end portion having therein a plurality of adjustment holes for attaching selectively a fishing line thereto to vary the angle between said line and the longitudinal axis of said body,
said body having mounted thereon a longitudinally displaceable balance weight to modify the position of the center of gravity thereof,
guide means for the end of said line on said body permitting travel of said line therethrough thus forming a sliding connection between said lever and a hook on said end, whereby the application of a retarding load to said hook is transmitted to said lever causing said device to ascend to the surface and to again dive when said application ceases.

2. The device as set forth in claim 1, further including a central stabilizer on the upper part of said body having a plurality of aligned adjustment holes therein, and
said lever being selectively pivotable to one of said holes.

3. The device as set forth in claim 1, further including securing means on the upper part of said body for grasping and holding said lever in place, when said lever is moved past said position proximate to said front end in response to a tug on said hook and line.

4. The device as set forth in claim 1, further having, a recess in said body for holding bait, and
a perforated closure for said recess.

5. The device, as set forth in claim 1, including,
a fixed guide for said line on said tail fin.

6. The device, as set forth in claim 1, wherein
said body has an elongated recess, and
said balance weight is longitudinally displaceable therein.

7. The device, as set forth in claim 1, wherein
said weight is secured to the front part of said body by a screw attachment.

8. The device, as set forth in claim 1, having
a vertical stay pivoted to the upper and lower part of said vertical fin, and
guide means consisting of a ring mounted for vertical movement on said stay, whereby said line can be directed on one side of said body, thereby directing said device toward one of said sides.

* * * * *